(12) United States Patent
Katagiri

(10) Patent No.: US 6,339,275 B1
(45) Date of Patent: *Jan. 15, 2002

(54) ROTOR, METHOD FOR ASSEMBLING ROTOR, AND MOTOR USING THE ROTOR

(75) Inventor: Masayuki Katagiri, Nagano (JP)

(73) Assignee: Kabushiki Kaisha Sankyo Seiki Seisakusho, Nagano (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,543

(22) Filed: Oct. 8, 1999

(30) Foreign Application Priority Data

Oct. 12, 1998 (JP) .......................... 10-289189

(51) Int. Cl.⁷ ................................. H02K 1/22
(52) U.S. Cl. ..................... 310/261; 310/67 R
(58) Field of Search .............................. 310/261, 67 R, 310/91, 156, 90; 360/98.07, 99.04, 99.08, 99.11

(56) References Cited

U.S. PATENT DOCUMENTS

| | | | | | |
|---|---|---|---|---|---|
| 4,795,924 | A | * | 1/1989 | Kamiyama et al. | 310/67 R |
| 5,528,092 | A | * | 6/1996 | Ohta | 310/67 R |
| 5,729,404 | A | * | 3/1998 | Dunfield et al. | 360/99.08 |
| 5,942,820 | A | * | 8/1999 | Yoshida | 310/67 R |

* cited by examiner

Primary Examiner—Elvin Enad
Assistant Examiner—Thanh Lam
(74) Attorney, Agent, or Firm—Sughrue Mion, PLLC

(57) ABSTRACT

A rotor includes a hollow rotor case having a cylindrical portion and flanges on ends of the cylindrical portion, an annular magnet fixed to the inner circumferential surface of the cylindrical portion, and a hub having a central portion from which a rotary shaft extends upright. One of the flanges of the rotor case is fixed to the lower surface of the hub.

12 Claims, 4 Drawing Sheets

ROTOR, METHOD FOR ASSEMBLING ROTOR, AND MOTOR USING THE ROTOR

BACKGROUND OF THE INVENTION

1. Field of the Invention

The present invention relates to a motor which is used in CD-ROM drives, DVD-ROM drives, and the like to drive and rotate data recording disks.

2. Description of Related Art

A brushless motor illustrated in FIG. 4 is available as a disk driving motor. The motor comprises a bracket 105, a hub 101 that rotates relative to the bracket 105, a rotor case 107 supported by an inner circumferential surface of the hub 101, and a shaft 102 supporting the hub 101, a sleeve 103 supporting the shaft 102, a stator 106 and a thrust plate 104 positioned to face an end surface of the shaft 102. A joint of the rotor case 107 with the hub 101 is bent along the inner circumferential surface of the hub 101.

As an attempt to reduce vibrations and noise during the driving of the motor, the motor is designed to increase the joining area between the hub 101 and the rotor case 107. That is, the rotor case 107 is bent along the hub 101 to increase the joining area, and using the bent portion the rotor case 107 is joined with the hub 101 to which the shaft 102 is fixed.

This design is, however, insufficient from the viewpoint of reduction of noise associated with the current tendency toward the high-speed rotation of the motor because an overall balance precision of the motor depends on the component precision of individual rotary elements including the hub 101, the rotor case 107, and the magnet 108, and the unbalance of the individual rotary elements with respect to the shaft 102 causes larger vibrations as the speed of motor rotation is increased.

While the hub 101 is directly attached to the shaft 102, the rotor case 107 is joined with the shaft 102 via the hub 101. Since the rotor case 107 is manufactured by pressing, the unbalance of the rotor case 107 with respect to the shaft 102 is likely to occur when the rotor case 107 is joined with the hub 101. In addition, a rare-earth magnet is generally used for the magnet 108, so a clearance exists between the magnet 108 and the rotor case 107 due to tolerance. Therefore, the fixing of the magnet 108 causes unbalance, making it difficult to reduce noise.

SUMMARY OF THE INVENTION

The present invention was made in view of the aforementioned problems, and an object thereof is to provide a rotor, a method for assembling a rotor, and a motor using a rotor, which can reduce noise and vibrations without increasing the number of components of the rotor.

A rotor provided in accordance with the present invention is characterized in that a magnet is fixed to a rotor case prior to magnetization. Therefore, it is possible to reduce the number of magnetizing steps during assembly.

A rotor provided in accordance with the present invention is characterized in that positions of a rotor case and a magnet are determined by a centering jig using a rotary shaft as a reference. Therefore, mechanical and electrical unbalances can be extremely reduced, thus lessening noise and vibrations.

A rotor provided in accordance with the present invention is characterized by a first flange portion that extends radially outward form the top end of a cylindrical portion of a rotor case. Therefore, the flange portion does not obstruct assembly of the rotor. Further, it is possible to magnetize the magnet after the magnet is fixed to the rotor case. It is preferable that the first flange portion of the rotor case is brought into abutment with the bottom surface of a hub and fixed thereto by an electrically joining means. This facilitates the fixing of the rotor case to the hub with increased strength.

A rotor provided in accordance with the present invention is characterized by a second flange portion that extends radially inward from the bottom end of a rotor case. The second flange portion determines the axial position of the magnet, and prevents the removal of the magnet. Moreover, the magnet can be set to have an appropriate length (having no waste length) in terms of a positional relationship with a core.

The present disclosure relates to the subject matter contained in Japanese patent application No. Hei. 10-289189 (filed on Oct. 12, 1998), which is expressly incorporated herein by reference in its entirety.

DETAILED DESCRIPTION OF THE PREFERRED EMBODIMENT

Figure 1:
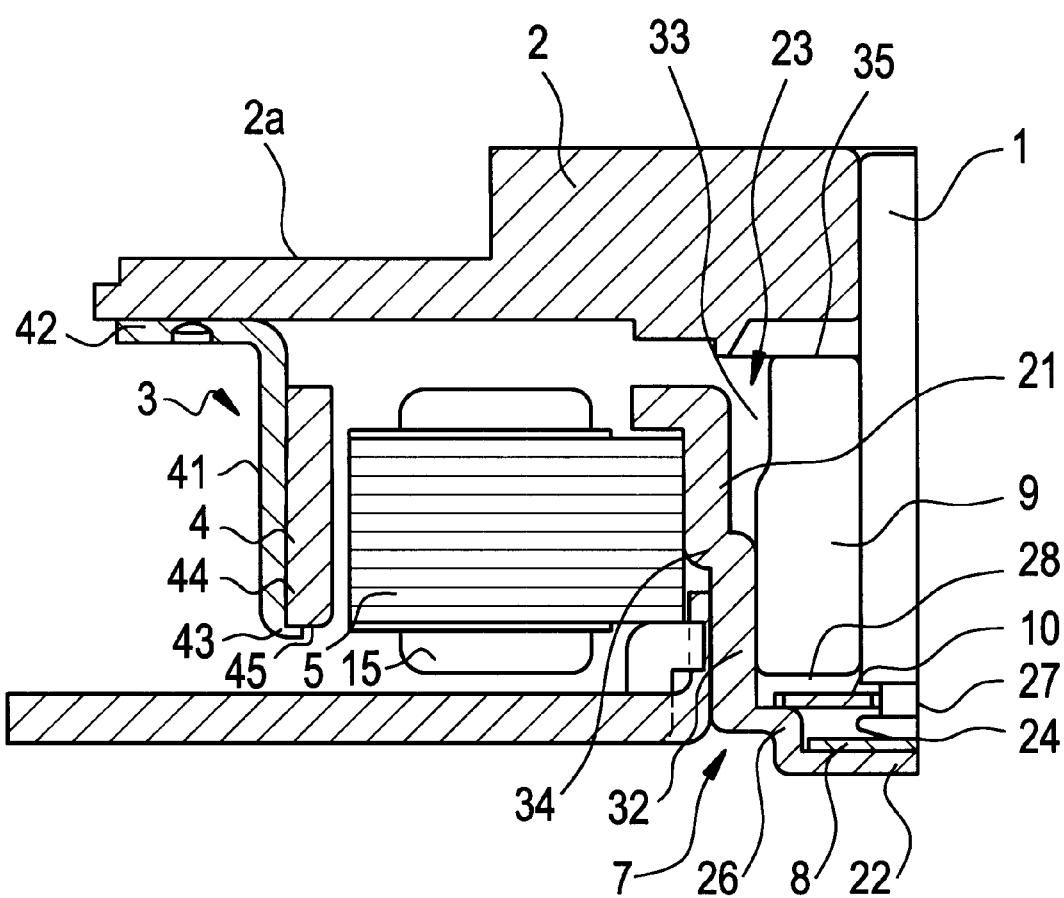
FIG. 1 is a cross sectional view of a motor according to an embodiment of the present invention.

A preferred embodiment of the present invention will be described hereinafter referring to the drawings. As illustrated in FIG. 1, a bearing housing 7 is formed, by pressing a metallic sheet, into a cup shape to have a bottom portion 22 integral with an end of a cylindrical portion 21. The cylindrical portion 21 and bottom portion 22 cooperatively define a hollow space 23 therein. A thrust backing plate 8 is positioned on the bottom portion 22 within the hollow space 23. A radial bearing 9 is fitted onto an inner circumferential surface of the cylindrical portion 21 of the bearing housing 7. An inner circumferential surface of a bearing bore passing through the radial bearing 9 supports the rotary shaft 1 rotatable about a central axis thereof. The thrust backing plate 8 abuts an end 24 of the rotary shaft 1 to regulate the thrust position of the rotary shaft 24.

A hub 2 for mounting a disk thereon is fixed to a top end portion of the rotary shaft 1. The hub 2 has a disk mounting surface 2a and is formed into a disk shape. A rotor case 3 is formed, for instance, by pressing a metallic sheet of a magnetic material. The rotor case 3 has a cylindrical portion 41, a first flange portion 42 extending radially outward from a top end of the cylindrical portion 41, and a second flange portion 43 extending radially inward from a bottom end of the cylindrical portion 41. The first flange portion 42 extends radially outward longer than the radial thickness of the magnet 4, and the second flange portion 43 extends radial inward shorter than the radial thickness of the magnet 4. That is, a distance between the radially innermost end of the first flange portion 42 and the radially outermost end of the first flange portion 42 is larger than the radial thickness of the magnet 4, whereas a distance between the radially innermost end of the second flange 43 and the radially outermost end of the second flange 43 is smaller than the radial thickness of the magnet 4. The first flange portion 42 is secured onto a back surface of the hub 2 opposite from the disk mounting surface 2a by an electrically joining means such as welding, a mechanically joining means, or an adhesive means.

Since the first flange portion 42 extends radially outward from the cylindrical portion 41, the first flange portion 42 is joined with the hub 2 at location outer than the cylindrical portion 41. Therefore, it is possible to dispense with the insertion of a welding stick into the inside of the cylindrical portion 41 which is required in a case where a flange arranged to extend radially inward is fixed. This makes the joining easier, and enhances the processability and the joining precision of the both members.

The magnet 4 is attached to an inner wall of the rotor case 3. The magnet 4 is axially positioned by abutting the second flange portion 43 provided on the bottom end of the rotor case 3, and is circumferentially fixed by an adhesive and the like. This arrangement surely prevents the removal of the magnet 4 from the rotor case 3.

A stator core 5 is fitted onto an outer circumferential surface of the cylindrical portion 21 of the bearing housing 7, and positioned to face the inner circumferential surface of the magnet 4. The stator core 5 has a plurality of radially projecting poles that are arranged at constant angular intervals in the circumferential direction. A drive coil 15 is wound around each of the projecting poles. The magnet 4, the rotor case 3, the hub 2, and the rotary shaft 1 are driven to rotate integrally.

The bearing housing 7 is formed into a cup shape by drawing a metallic sheet to have the integral cylindrical portion 21, an integral bearing fixing portion 32, and the integral bottom portion 22. The radial bearing 9 of sintered, oil-impregnated material is fixed to the bearing fixing portion 32. Even if an oil leaks from the radial bearing 9 toward the bottom portion 22, the oil does not escape outside the bearing housing 7 since the bearing housing 7 is in the form of the cup shape as mentioned above.

The bearing housing 7 has a step 26 located between the bottom portion 22 and an end surface 28 of the radial bearing 9. An inner diameter of the cylindrical portion 21 below the step 26 is smaller while that above the step 26 is larger. The rotary shaft 1 has a smaller diameter portion 27 located between an end 24 of the shaft 1 on the thrust backing plate 8 side and the end surface 28 of the radial bearing 9. A washer 10 is provided, as an annular, removal-preventive member, between the step 26 of the bearing housing 7 and the end surface 28 of the radial bearing 9. The washer 10 is engaged with the smaller diameter portion 27 of the rotary shaft 1. The washer 10 prevents the removal of the rotary shaft 1 by abutting the end surface 28 of the radial bearing 9.

The bearing fixing portion 32 located above the step 26 has an inner diameter slightly smaller than the outer diameter of the radial bearing 9. The radial bearing 9 is press-fitted into and thus fixed to an inner circumferential surface of the bearing fixing portion 32.

A step 34 is provided substantially in an axially central portion of the cylindrical portion 21 of the bearing housing 7. The bearing fixing portion 32 located below the step 34 supports the lower half of the radial bearing 9, whereas an annular gap 33 is formed above the step 34 between the inner circumferential surface of the cylindrical portion 21 of the bearing housing 7 and the outer circumferential surface of the radial bearing 9.

The gap 33 serves as an oil reservoir. When the rotary shaft 1 rotates, the oil discharged from the radial bearing 9 overflows from the top surface 35 of the radial bearing 9 toward the outer circumference of the radial bearing 9, is accumulated in the gap 33 and then returns to the radial bearing 9, for circulation. Thus, since the oil does not escape outside the bearing housing 7, a motor which is highly reliable and has long service life can be obtained.

Note that the shapes of the bearing housing 7 and rotary shaft 1 are not limited to the above configurations, and can be modified in various ways on demand.

Figure 2:
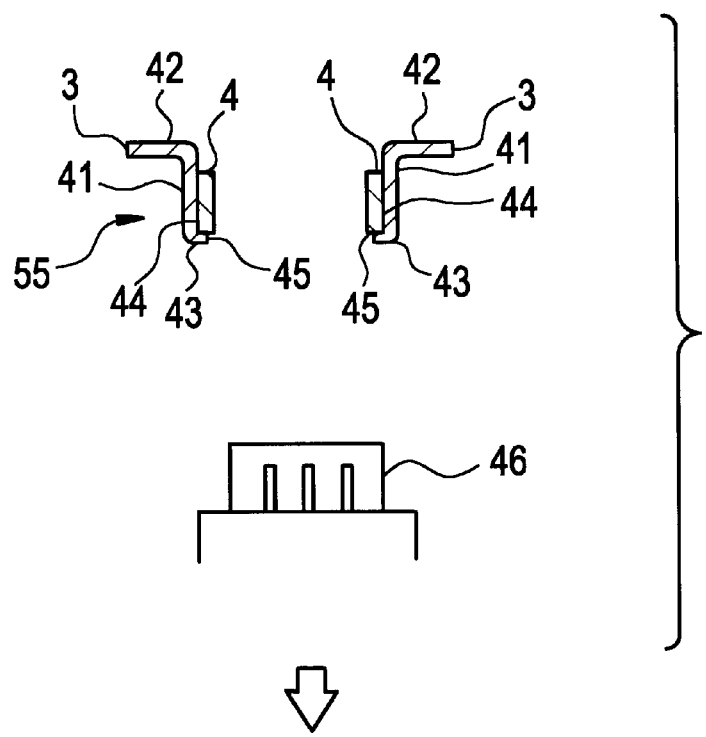
FIGS. 2(a) and 2(b) are side views showing assembling steps of a rotor assembly, which can be used to assemble the motor according to the embodiment.
Figure 2:
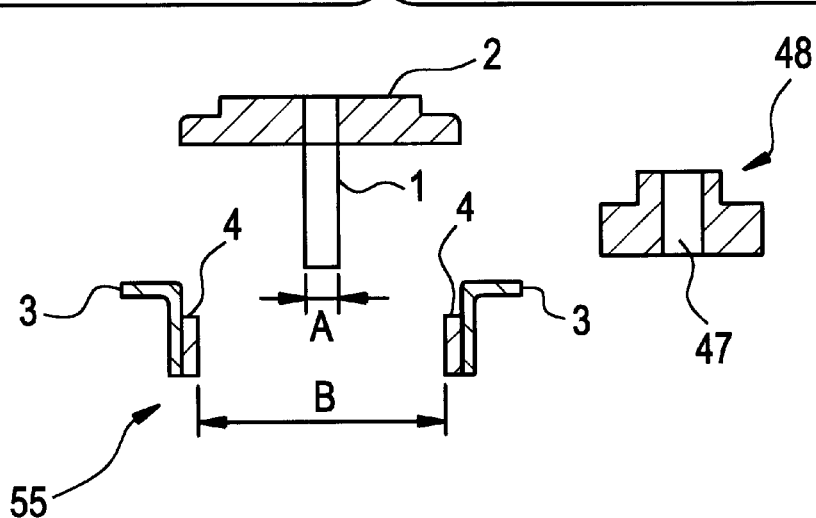
Figure 3:
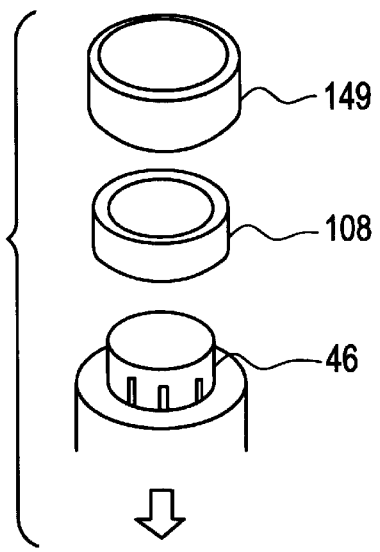
FIGS. 3(a)–3(c) are side views showing assembling steps of a rotor-assembly, which can be used to assemble a related motor.
Figure 3:
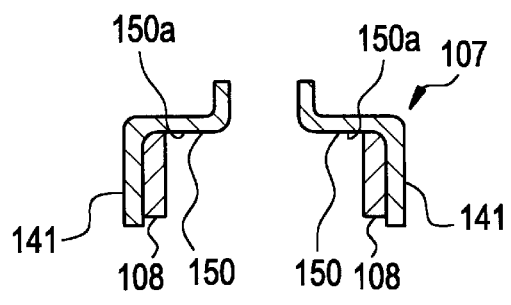
Figure 3:
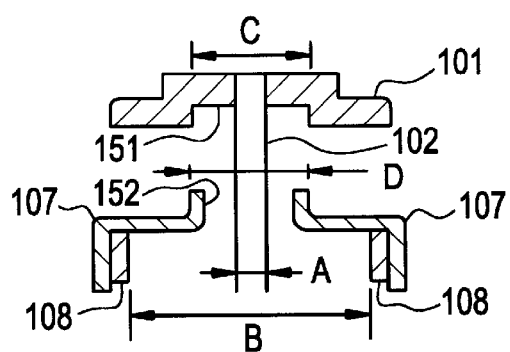
Figure 4:
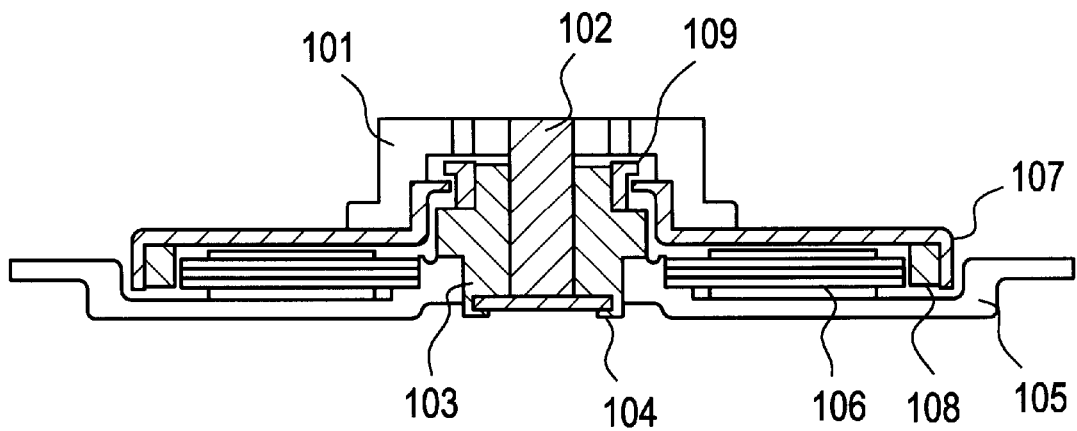
FIG. 4 is a cross-sectional view showing the related motor.

A method for assembling a rotor according to the present invention will be described. FIGS. 2(a) and 2(b) show a method of assembling a rotor according to the present invention, and FIGS. 3(a) to 3(c) show a method of assembling a rotor of a related motor typically shown in FIG. 4.

As illustrated in FIG. 2(a), the annular magnet 4 is inserted into the inside of the rotor case 3 until a bottom surface 45 of the magnet 4 abuts a top surface 44 of the second flange 43, thereby axially positioning the magnet 4 with respect to the rotor case 3. Next, the inner circumferential surface of the cylindrical portion 41 of the rotor case 3 is fixed to the outer circumferential surface of the magnet 4. Then, a magnetizing head 46 is placed close to the inner circumferential surface of the magnet 4 to magnetize the magnet 4 in multipolar. In this manner, a rotor case assembly 55 is formed. At this time, since the opening of the cylindrical portion 41 of the rotor case 3 is substantially constant in diameter over the entire length of the cylindrical portion 41, the magnetizing head 46 can be inserted into the cylindrical portion 41 for magnetization. Consequently the magnet 4 can be magnetized evenly.

On the other hand, to form a rotor case assembly of the related motor, the following steps are required. As illustrated in FIG. 3(a), the magnet 108 is inserted into a cylindrical temporary case 149 having an opening of a constant diameter, and thereafter the magnetizing head 46 is placed close to the inner circumferential surface of the magnet 108 to magnetize the magnet 108 in multipolar. Then, as illustrated in FIG. 3(b), the magnetized magnet 108 is taken out from the temporary case 149 and fixed to a rotor case 107.

In other words, prior to fixing the magnet 108 to the cup-like rotor case 107 of the related motor by adhesive or the like, it is required to magnetize the drive magnet 108 in a state where the magnet 108 is placed in the temporary case 149. In contrast, the rotor case 3 according to the present invention is configured to have the opening sufficiently large in diameter from the top end to the bottom end, and therefore, the magnetization to the magnet 4 can be carried out in a state where the magnet 4 is fixed to the rotor case 3. This makes the magnetizing process simple, and omits the use of the temporary case 149.

Further, as illustrated in FIG. 3(b), a flange portion 150 is provided to the cylindrical portion 141 of the related rotor case 107, and the magnet 108 is inserted until the magnet 108 abuts a bottom surface 150a of the flange portion 150 of the rotor case 108. Consequently, the magnet 108 must be inserted into the cylindrical portion 141 deeply to reach a position where a part of the magnet 108 does not face the core 106 in the radial direction, hence wasting the magnetic material.

In contrast, as shown in FIG. 2(a), the flange portion 43 is arranged to extend radially inward from the bottom end of the rotor case 3. The flange portion 43 determines the axial position of the magnet 4, and prevents the removal of the magnet 4. Moreover, the magnet 4 can be set to have an appropriate length (having no waste length) in terms of a positional relationship with the core 5.

Moreover, since a dimensional error exists between the inner diameter of the rotor case 10 and the outer diameter of the magnet 108, a gap is created when the rotor case 10 and the magnet 108 are fixed together. If the magnet 108 is fixed to the rotor case 107 with the gap remaining therebetween, a rotor assembly has a poor balancing characteristic.

As illustrated in FIG. 3(c), the related rotor is assembled such that a protruding portion 152, formed in the rotor case assembly by fluing or flanging, is fitted to a recess portion 151 of the hub 101 on which the rotary shaft 102 is provided upright at its center. That is, the hub 101 to which the rotary shaft 102 is fixed is simply fitted to the rotor case 107. In this case, a mechanical unbalance X of a rotor using the outer circumference dimension A of the rotary shaft 102 as a reference is expressed as follows:

$$X=B+C+D$$

where B is the tolerance of the inside diameter of the magnet 108, C is the tolerance of the inside diameter of the recess portion 151 of the hub 101, and D is the tolerance of the outside diameter of the protruding portion 152 of the rotor case 107. Thus, the sum of the precision tolerances of these components is a cause of the mechanical unbalance of the rotor.

In contrast, the rotor assembling method according to the present invention employs a centering jig 48 provided at its center with an axial through-hole 47 into which the rotary shaft 1 is insertable. As illustrated in FIG. 2(b), the centering jig 48 is fitted to the inside of the rotor case assembly 55 so that the center of the rotor case assembly 55 is made coincident with the center of the axial through-hole 47. The outer diameter B of the centering jig 48 is set almost equal to the inner diameter of the magnet 4.

Next, the rotary shaft 1 formed upright in the center of the hub 2 is inserted into the through-hole 47 of the centering jig 48, the first flange portion 42 of the rotor case 3 is brought into abutment with the bottom surface of the hub 2, and then the rotor case 3 and the hub 2 are fixed together by an electrically joining means, a mechanically joining means, or an adhesive means. Note that adopting the electrically joining means, such as welding, provides inexpensive but reliable joining of the members. The rotor of the present invention is assembled in the above manner.

According to the rotor assembling method of the present invention, the inner circumference of the magnet 4 is brought into abutment with the centering jig 46 to thereby adjust the inner circumferential dimension of the magnet 4 using the rotary shaft 1 as a reference, the mechanical unbalance of the rotor depends only on the precision of the centering jig 46, and is not influenced by the precision of each component. Thus, a rotor can be obtained in which the hub 2 and the rotary shaft 1 are arranged with high precision.

Although the invention made by the present invention has been specifically described with reference to the embodiment, the invention is not limited to the aforementioned embodiment, and can be various modified without departing from the spirit and scope of the invention.

What is claimed is:

1. A rotor comprising:

a rotary shaft;

a hub having a disk mounting surface, and a central portion from which said rotary shaft extends upright;

a rotor case having a cylindrical portion and a first flange portion extending radially outward from one end of said cylindrical portion, said first flange portion being fixed to a back side of said hub opposite from said disk mounting surface, wherein said first flange portion is electrically joined to said hub; and an annular magnet fixed to an inner circumferential surface of said cylindrical portion, wherein said back side of said hub opposite from said disk mounting surface is a flat surface which extends from substantially an outer area of said center portion to an outer edge of said hub, wherein said rotor case is adjustably fixed in a radius direction with respect to the flat surface of said back side of said hub.

2. The rotor as set forth in claim 1 wherein said rotor case has a second flange portion extending radially inward from the other end of said cylindrical portion, and said second flange portion abuts said magnet to axially position said magnet.

3. The rotor as set forth in claim 2 wherein said first flange portion has a radial length larger than a radial thickness of said magnet, and said second flange portion has a radial length smaller than said radial thickness of said magnet.

4. The rotor as set forth in claim 2, wherein a surface of said first flange portion has a flat surface which faces said flat surface of said hub, and both said flat surface of said first flange portion and said flat surface of said hub are electrically joined together by welding.

5. The rotor as set forth in claim 1, wherein said first flange portion is welded to said hub.

6. The rotor as set forth in claim 1, wherein said first flange portion of said rotor case is fixed to said back side of said hub without abutting other portions of said back side of said hub.

7. A motor comprising:

a rotary shaft;

a hub having a disk mounting surface, and a central portion from which said rotary shaft extends upright;

a rotor case having a cylindrical portion and a first flange portion extending radially outward from one end of said cylindrical portion, said first flange portion being fixed to a back side of said hub opposite from said disk mounting surface, wherein said first flange portion is electrically joined to said hub;

an annular magnet fixed to an inner circumferential surface of said cylindrical portion; and an armature facing said magnet, wherein said back side of said hub opposite from said disk mounting surface is a flat surface which extends substantially from an outer area of said central portion to an outer edge of said hub, wherein said rotor case is adjustably fixed in a radius direction with respect to the flat surface of said back side of said hub.

8. The motor as set forth in claim 7, further comprising:

a bearing for rotatably supporting said rotary shaft; and a bearing housing holding said bearing;

wherein said bearing housing presents a cup shape formed as a consequence of drawing a metallic sheet, and has an integral cylindrical portion and an integral bottom portion.

9. The motor as set forth in claim 7, further comprising:

a bearing for rotatably supporting said rotary shaft; and a bearing housing holding said bearing, said bearing housing having a small diameter portion, a large diameter portion and a step located axially between said small and large diameter portions;

wherein said smaller diameter portion holds said bearing, and said large diameter portion defines an oil reservoir radially between said larger diameter portion and an outer circumferential surface of said bearing.

10. The rotor as set forth in claim 7, wherein said first flange portion is welded to said hub.

11. The rotor as set forth in claim 7, wherein a surface of said first flange portion has a flat surface which faces said flat surface of said hub, and both said flat surface of said first flange portion and said flat surface of said hub are electrically joined together by welding.

12. The motor as set forth in claim 7, wherein said first flange portion of said rotor case is fixed to said back side of said hub without abutting other portions of said back side of said hub.

* * * * *